(12) United States Patent
Couch et al.

(10) Patent No.: US 7,935,314 B2
(45) Date of Patent: May 3, 2011

(54) APPARATUS FOR MIXING REGENERATED AND CARBONIZED CATALYST

(75) Inventors: Keith A. Couch, Arlington Heights, IL (US); Kelly D. Seibert, Carpentersville, IL (US); Robert L. Mehlberg, Wheaton, IL (US); Daniel R. Johnson, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 435 days.

(21) Appl. No.: 12/241,290

(22) Filed: Sep. 30, 2008

(65) Prior Publication Data

US 2010/0080741 A1 Apr. 1, 2010

(51) Int. Cl.
| | |
|---|---|
| *B01J 8/18* | (2006.01) |
| *F27B 15/00* | (2006.01) |
| *F27B 15/18* | (2006.01) |
| *B01J 8/08* | (2006.01) |
| *B01J 38/30* | (2006.01) |
| *C10G 45/04* | (2006.01) |
| *C10G 45/60* | (2006.01) |
| *C10G 35/10* | (2006.01) |

(52) U.S. Cl. ........ 422/144; 422/141; 422/145; 422/219; 502/41; 208/213; 208/158

(58) Field of Classification Search ........... 422/141, 422/144, 145, 219; 502/41; 208/91, 113, 208/213, 158
See application file for complete search history.

(56) References Cited

U.S. PATENT DOCUMENTS

| | | | |
|---|---|---|---|
| 3,888,762 A | 6/1975 | Gerhold | 208/120 |
| 4,424,116 A | 1/1984 | Hettinger, Jr. | 208/120 |
| 4,440,629 A * | 4/1984 | Stine | 208/111.15 |
| 5,372,704 A | 12/1994 | Harandi et al. | 208/74 |
| 5,597,537 A | 1/1997 | Wegerer et al. | 422/144 |
| 6,010,618 A | 1/2000 | Lomas | 208/113 |
| 6,027,696 A | 2/2000 | Das et al. | |
| 6,143,253 A * | 11/2000 | Radcliffe et al. | 422/145 |
| 6,558,530 B2 | 5/2003 | Schlosser et al. | |
| 6,616,900 B1 | 9/2003 | Lomas | 422/147 |
| 7,026,262 B1 * | 4/2006 | Palmas et al. | 502/41 |
| 2007/0122316 A1 | 5/2007 | Lomas et al. | |
| 2007/0213573 A1 | 9/2007 | Ross et al. | |
| 2010/0078357 A1 | 4/2010 | Couch et al. | |

FOREIGN PATENT DOCUMENTS

| | | |
|---|---|---|
| CN | 1428402 | 7/2003 |
| CN | 1200083 | 5/2005 |
| CN | 101029248 | 2/2006 |
| EP | 259155 | 3/1987 |
| WO | WO 95/27019 | 12/1995 |
| WO | WO 2007/094770 A1 | 8/2007 |

OTHER PUBLICATIONS

U.S. Appl. No. 12/241,294, filed Sep. 30, 2008, Keith A. Couch et al.

* cited by examiner

*Primary Examiner* — Walter D Griffin
*Assistant Examiner* — Natasha Young
(74) *Attorney, Agent, or Firm* — James C Paschall

(57) ABSTRACT

An apparatus for mixing regenerated and carbonized catalyst involves obstructing upward flow of catalyst by one or more baffles between a catalyst inlet and a feed distributor. Each catalyst stream may be passed to opposite sides of a riser. Baffles obstruct upward flow to effect mixing of regenerated and carbonized catalyst to obtain a more uniform temperature and catalyst mixture before contacting the feed.

19 Claims, 3 Drawing Sheets

APPARATUS FOR MIXING REGENERATED AND CARBONIZED CATALYST

BACKGROUND OF THE INVENTION

The invention relates to an apparatus for mixing carbonized and regenerated catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel or mixing chamber to allow the regenerated and carbonized catalyst to reach a temperature equilibrium before contacting the hydrocarbon feed. A mixed catalyst with more uniform temperature avoids hot spots that can generate nonselective cracking to reduce the value of the product hydrocarbons.

Improved apparatus and processes are sought in the mixing of carbonized and regenerated catalyst.

SUMMARY OF THE INVENTION

We have found that the mixing chamber for process units that are designed to process large amounts of feed can become very large which adds to the capital cost and requires more catalyst inventory to fill the increased volume added by the chamber to an entire process unit. However, we have discovered that carbonized and regenerated catalyst can be mixed in the base of a reactor riser by use of at least one baffle below the feed distributor to achieve substantial temperature equilibration before the catalyst contacts the feed without the need for a mixing chamber. We have also found that mixing catalyst is improved by passing carbonized and regenerated catalyst to opposite sides of the riser.

DETAILED DESCRIPTION OF THE INVENTION

Figure 1:
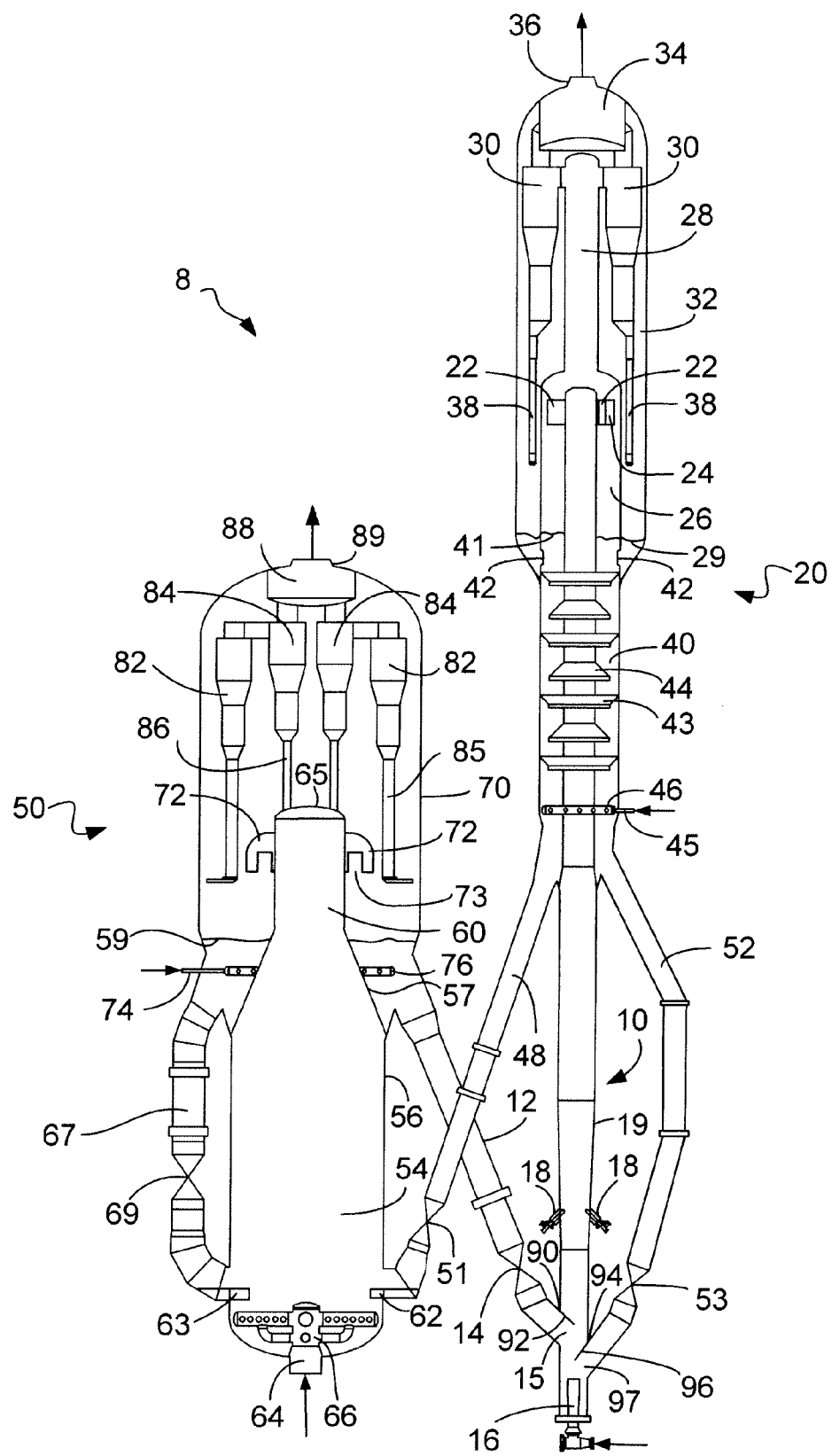
FIG. 1 is a schematic, elevational view of an FCC unit incorporating the present invention.

The apparatus of the present invention is for contacting catalyst with a hydrocarbon feed or for mixing regenerated catalyst and carbonized catalyst for contact with a hydrocarbon feed. The present invention may be useful in any solids-gas contacting equipment. However, ready usefulness is found in an FCC unit. FIG. 1 shows an FCC unit 8 that includes a reactor vessel 20 and a regenerator vessel 50. A regenerator catalyst conduit 12 transfers regenerated catalyst from the regenerator vessel 50 at a rate regulated by a control valve 14 to a reactor riser 10 through a regenerated catalyst inlet 15. A fluidization medium such as steam from a nozzle 16 urges a stream of catalyst upwardly through the riser 10 at a relatively high density. A plurality of feed distributors 18 inject feed across the flowing stream of catalyst particles to distribute hydrocarbon feed to the riser 10. The feed distributors 18 are located on a frustum 19 of the riser. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 that effects partial separation of gases from the catalyst. A transport conduit 28 carries the hydrocarbon vapors, including stripped hydrocarbons, stripping media and entrained catalyst to one or more cyclones 30 in the reactor vessel 20 which separates carbonized catalyst from the hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion of the carbonized catalyst leaves the disengaging vessel 26 of the reactor vessel 20 through a spent catalyst conduit 48 and passes into the regenerator vessel 50 at a rate regulated by a slide valve 51. A second portion of the carbonized catalyst that has been coked in reactor riser 10 leaves the disengaging vessel 26 of the reactor vessel 20 and is passed through a carbonized catalyst conduit 52 back to the riser 10 at a rate regulated by a control valve 53. The carbonized catalyst conduit 52 is in downstream communication with the reactor vessel 20 and intersects the riser 10 at a carbonized catalyst conduit intersection 94. The carbonized catalyst conduit 52 is in downstream communication with the outlet port 24 of the riser 10 and in upstream communication with a carbonized catalyst inlet 97 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (8960 to 1150° F.) at the riser outlet port 24 and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 15 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y Zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 of perhaps at least 1.1 m/s (3.5 ft/s) under fast fluidized flow conditions. In an embodiment, the lower chamber 54 may have a catalyst density of from 48 to 320 kg/m$^3$ (3 to 20 lb/ft$^3$) and a superficial gas velocity of 1.1 to 2.2 m/s (3.5 to 7 ft/s). The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The regenerator vessel 50 also includes an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposits catalyst through diplegs 85, 86 into dense catalyst bed 59. Flue gas exits the cyclones 82, 84 and collects in a plenum 88 for passage to an outlet nozzle 89 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. In this embodiment, gas is added here not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas will be fed to the upper chamber 70 through fluidizing conduit 74.

From about 10 to 30 wt-% of the catalyst discharged from the lower chamber 54 is present in the gases above the outlets 73 from the riser section 60 and enter the cyclones 82, 84. The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 704° C. (1100 to 1300° F.) in the lower chamber 54 and about 649 to about 760° C. (1200 to 1400° F.) in the upper chamber 70. The regenerated catalyst conduit 12 is in downstream communication with the regenerator vessel 50 and intersects the riser 10 at a regenerated catalyst conduit intersection 90. Regenerated catalyst from dense catalyst bed 59 is transported through regenerated catalyst conduit 12 from the regenerator vessel 50 back to the reactor riser 10 through the control valve 14 where it again contacts feed as the FCC process continues.

A regenerated catalyst baffle 92 is disposed in the riser 10 above the regenerated catalyst inlet 15 and below the feed distributors 18 proximate to the regenerated catalyst conduit intersection 90. The regenerated catalyst baffle 92 partially obstructs upward flow of the regenerated catalyst in the riser 10 to mix the regenerated catalyst in the riser before it contacts the hydrocarbon feed injected from feed distributors 18 into the riser 10. In an embodiment, the regenerated catalyst baffle 92 is disposed in the riser 10 at or above the regenerated catalyst conduit intersection 90. In a further embodiment, the regenerated catalyst baffle 92 is disposed in the riser 10 above the regenerated catalyst inlet 15.

We have also found when a stream of carbonized catalyst and a stream of regenerated catalyst are both fed into the riser 10; they tend not to mix before contacting the hydrocarbon feed. Accordingly, the feed can encounter catalyst at varying temperatures resulting in non-selective cracking to a composition with relatively more undesirable products. In a preferred embodiment, to ensure mixing between the carbonized catalyst and the regenerated catalyst, in addition to the aforementioned regenerated catalyst baffle 92, a second, carbonized catalyst baffle 96 is disposed in the riser above the carbonized catalyst inlet 97 and below the feed distributors 18 proximate to the carbonized catalyst conduit intersection 94. The carbonized catalyst baffle 96 in the riser 10 partially obstructs upward flow of the carbonized catalyst to effect mixing to provide mixed catalyst of carbonized and regenerated catalyst. In an embodiment, the carbonized catalyst baffle 96 is disposed in said riser at or above said carbonized catalyst conduit intersection 94.

The carbonized catalyst baffle 96 and the regenerated catalyst baffle 92 operate to mix the hot regenerated catalyst and the cooler carbonized catalyst that has not undergone a hot regeneration cycle in the regenerator vessel 50. In describing the mixing operation of the baffles 92 and 96, the baffles will be referred to as lower and upper baffles and lower and upper catalyst conduits which will depend upon the desired arrangement. The arrangement in the drawings has the regenerated catalyst conduit 12 as the upper catalyst conduit, the carbonized catalyst conduit 52 as the lower catalyst conduit, the regenerated catalyst baffle 92 as the upper baffle, and the carbonized catalyst baffle 96 as the lower baffle. The lower baffle 92, 96 collects the rising fluidizing gas from nozzle 16 and forces the catalyst from the lower catalyst conduit 12, 52 in a horizontal direction. The inflowing catalyst and fluidizing gas are directed to the opposing wall of the riser 10 and ascend vertically to contact the catalyst fed from the upper catalyst conduit 52, 12. The upper baffle 96, 92 preferably above the upper catalyst conduit intersection 90, 94 with the riser 10 not only causes the two catalyst streams to blend horizontally, but also induces additional mixing through the formation of a circular blending eddy between the rising fluidizing gas with catalyst and the catalyst stream flowing from the upper catalyst conduit. The mixing is effected to bring the respective catalyst streams closer to uniform temperature and homogeneous composition before encountering the hydrocarbon feed, which will result in cracking to more desirable products.

In an embodiment, the regenerated catalyst conduit intersection 90 is above the carbonized catalyst conduit intersection 94 and the regenerated catalyst inlet 15 is above the carbonized catalyst inlet 97. Steam can have a dealuminating effect on the zeolitic catalyst and this dealuminating effect increases proportionally with temperature. By bringing the cooler carbonized catalyst into the riser between the fluidizing gas which is typically steam from nozzle 16 and the regenerated catalyst from regenerated catalyst conduit 12, the carbonized catalyst has an opportunity to cool the regenerated catalyst before the regenerated catalyst stream encounters the steam. Consequently, the regenerated catalyst encounters the steam only at a reduced temperature at which the dealuminating effect is minimized.

Figure 2:
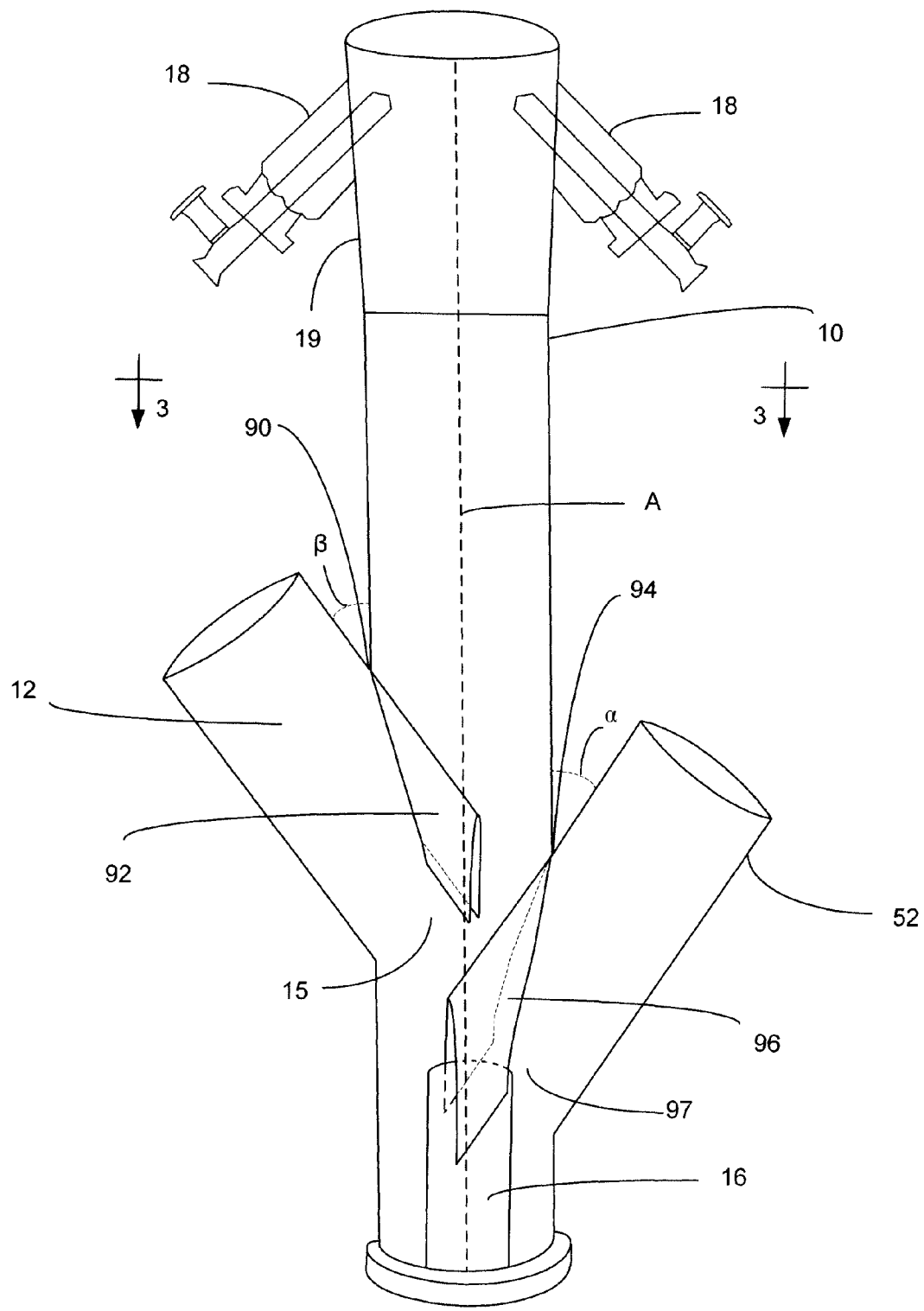
FIG. 2 is a perspective view of a lower partial section of FIG. 1.

FIG. 2 is a perspective view of the lower cut-away section of the riser 10. In an embodiment, the regenerated catalyst baffle 92 is above the regenerated catalyst inlet 15. Additionally, in an embodiment, the carbonized catalyst baffle 96 is above the carbonized catalyst inlet 97. In an embodiment, the regenerated catalyst baffle 92 is an extension of the regenerated catalyst conduit 12. Moreover, in an embodiment, the carbonized catalyst baffle 96 is an extension of the carbonized catalyst conduit 52. In an embodiment, a horizontal component of the regenerated catalyst baffle 92 extends into the riser 10 by at least one-half of the diameter of the riser. In an additional embodiment, a horizontal component of the regenerated catalyst baffle 92 extends into the riser 10 by no more than two-thirds of the diameter of the riser. In a further embodiment, a horizontal component of the carbonized catalyst baffle 96 extends into the riser 10 by at least one-half of the diameter of the riser. In a still further embodiment, a horizontal component of the carbonized catalyst baffle 96 extends into the riser 10 by no more than two-thirds of the diameter of the riser. The baffles 92 and 96 which take the embodiment of an extension of the conduit into the riser 10 define only a semi-cylindrical extension of the conduit, and each baffle is continuous with only the top half of the conduit. The bottom half of the conduit would not be continuous with the baffle. The top half of the conduit may actually extend into the riser 10 or the baffle 92, 96 may be welded to the interior wall of the riser at the intersection of the conduit with the riser 10. The horizontal component of both baffles may extend just over a center line A of the riser 10. The inner ends of each baffle 92, 96 may be cut in a vertical plane. The regenerated catalyst conduit intersection 90 and the carbonized catalyst conduit intersection 94 are located at the top-most point where the respective conduits intersect the riser 10. In an embodiment, the regenerated catalyst conduit intersection 90 with the riser is about 0.5 to about 2.0 riser diameters above the carbonized catalyst conduit intersection 94 with the riser. Preferably, the regenerated catalyst conduit intersection 90 with the riser is about one riser diameter above the carbonized catalyst conduit intersection 94. Additionally, the feed distributors 18 may be located on the frustum 19 about 1 to about 3 riser diameters above the upper catalyst conduit intersection which in FIG. 2 is the regenerated catalyst conduit intersection 90. In an embodiment the feed distributors 18 are at least 3 riser diameters above the upper catalyst conduit intersection but no higher than a top of the frustum 19. The carbonized catalyst conduit 52 may approach the riser 10 at an acute angle α of about 30 to about 55 degrees and preferably between about 40 and about 50 degrees at the carbonized catalyst conduit intersection 94. The regenerated catalyst conduit 12 may approach the riser at an acute angle that is less than that of the carbonized catalyst conduit. The regenerated catalyst conduit 12 may approach the riser at an acute angle β of about 15 to about 50 degrees and preferably about 25 to about 35 degrees at the regenerated catalyst conduit intersection 90. Hence, the regenerated catalyst in the regenerated catalyst conduit 12 is fed to the riser 10 at an acute angle β of about 15 to about 50 degrees and preferably about 25 to about 35 degrees with respect to the riser 10. Other approach angles may be suitable. The baffles 92 and 96 may define the respective acute angle α and β which the corresponding catalyst conduit 12, 52 defines with the riser 10. The nozzle 16 may extend into a lower inlet, which in the embodiment of FIG. 2 is the carbonized inlet 97, to a height that is higher than a midpoint of the inlet.

Figure 3:
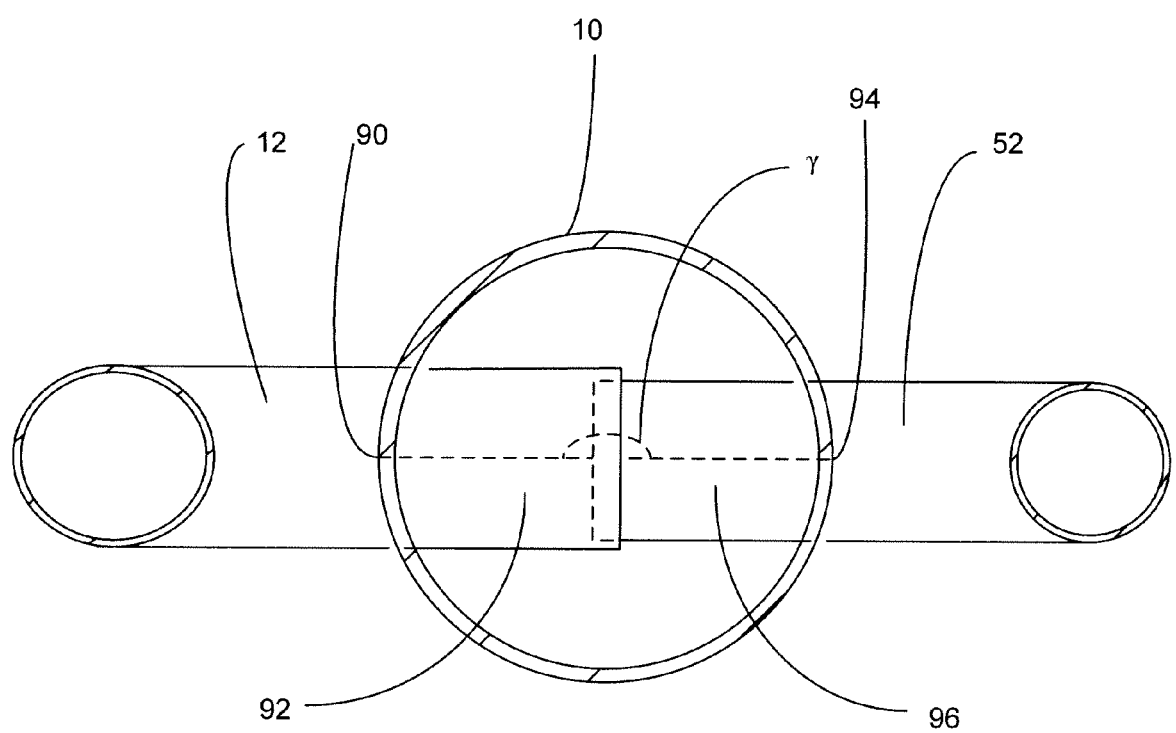
FIG. 3 is a sectional view of FIG. 2 taken at segment 3-3.

Best mixing is effected with the carbonized catalyst conduit 52 and the regenerated catalyst conduit 12 approach the riser on opposite sides. FIG. 3 is a cross-section of FIG. 2 taken at segment 3-3. Carbonized catalyst conduit 52 joins the riser 10 at carbonized catalyst conduit intersection 94. The carbonized catalyst baffle 96 extends into the riser from a location proximate to the carbonized catalyst conduit intersection 94 and in FIG. 3 is continuous with the top half of the carbonized catalyst conduit 52. A horizontal component of carbonized catalyst baffle 96 extends into the riser 10 over half of a riser diameter as shown in phantom. Regenerated catalyst conduit 12 joins the riser 10 at regenerated catalyst conduit intersection 90. The regenerated catalyst conduit is typically larger in diameter than the carbonized catalyst conduit because it typically carries a greater flow rate of catalyst. The regenerated catalyst baffle 92 extends into the riser from a location proximate to the regenerated catalyst conduit intersection 90 and in FIG. 3 is continuous with the top half of the regenerated catalyst conduit 12. A horizontal component of regenerated catalyst baffle 92 extends into the riser 10 over half a riser diameter and preferably is above the carbonized catalyst baffle 96. Refractory lining may be used in the riser 10 to protect from abrasion but is not shown in the drawings. In FIG. 3, the regenerated catalyst conduit 12 and the carbonized catalyst conduit 52 define a horizontal obtuse angle γ of at least about 135 degrees at respective intersections 90, 94 and the baffles 92, 96 may follow the same angle. In FIG. 3, the angle γ defined by the regenerated catalyst conduit 12 and the carbonized catalyst conduit at the respective intersections 90, 94 is 180 degrees.

EXAMPLE

Computational Fluid Dynamic (CFD) modeling was used to evaluate the expected performance of an arrangement in which a carbonized catalyst conduit and a regenerated catalyst conduit both feed catalyst to a riser without any baffles. In the modeling, the regenerated catalyst inlet was below the spent catalyst inlet. The carbonized catalyst was assumed to have a coke on catalyst of 1 wt-%, a catalyst flow rate of 23,092,921 lb/h (10,474,771 kg/h), a gas flow rate of 11,112, lb/h (5,040 kg/h) and a temperature of 1020° F. (549° C.). The regenerated catalyst was assumed to have a coke on catalyst of 0 wt-%, a catalyst flow rate of 23,092,921 lb/h (10,474,771 kg/h), a gas flow rate of 11,112, lb/h (5,040 kg/h) and a temperature of 1367° F. (742° C.). The steam distributor was assumed to provide steam at a gas flow rate of 90,701 lb/h (41,141 kg/h) and a temperature of 310° F. (154° C.). Catalyst density was assumed to be 90 lb/ft$^3$ (1442 kg/m$^3$), and the gas was assumed to have a density of 0.106 lb/ft$^3$ (1.7 kg/m$^3$) and a viscosity of 0.036 cP. The heat capacity was assumed to be 0.24 Btu/lb-° F. (1 kJ/kg-° K.) for the gas and 0.275 Btu/lb-° F. (1.15 kJ/kg-° K.) for the catalyst.

Results showed that each catalyst stream essentially stayed on the side of the riser to which it was fed and the fluidizing steam injected at a bottom of the riser flowed upwardly between the two streams in a central region of lower density. The fluidizing steam operated as a barrier to prevent the two catalyst streams from mixing. The modeling revealed a calculated temperature differential of a 59 C° (106° F.) between the hottest and coolest regions in the riser at an elevation of about 4 meters above an intersection of the carbonized catalyst conduit with the riser. This temperature differential indicated a severe maldistribution of carbonized catalyst across the riser which would result in a poor yield performance.

CFD modeling was subsequently performed with riser with baffles of the present invention. A baffle was located above the inlet to the riser from each catalyst conduit. The baffles modeled were extensions of the top semi-cylindrical half of the catalyst conduits into the riser in accordance with an embodiment of the present invention. The modeling revealed a calculated temperature differential for the present invention of only a 9° C. (17° F.) between hottest and coolest regions in the riser at an elevation of about 4 meters above an intersection of the carbonized catalyst conduit with the riser. This temperature differential indicates good distribution between catalyst streams. The resulting differential for coke on catalyst is 0.054 wt-% at the same elevation. At an elevation of about 7 meters above an intersection of the carbonized catalyst conduit with the riser, which corresponds to about 3 riser diameters, the temperature differential was calculated to be about 6° C. (10° F.) and the differential for coke on catalyst was about 0.032 wt-%. Consequently, adequate mixing of carbonized and regenerated catalyst can be achieved without the need for a separate blending vessel.

The invention claimed is:

1. An apparatus for contacting regenerated catalyst with a hydrocarbon feed, said apparatus comprising:
    a riser in which said hydrocarbon feed is contacted with catalyst particles to catalytically crack hydrocarbons in said hydrocarbon feed to produce a gaseous product of lighter hydrocarbons and carbonized catalyst;
    a feed distributor for distributing hydrocarbon feed to said riser;
    a reactor vessel in communication with said riser, said reactor vessel for separating the carbonized catalyst and the gaseous product;
    a regenerator vessel in communication with said reactor vessel, said regenerator vessel for combusting carbon from the carbonized catalyst with an oxygen-containing gas to provide regenerated catalyst;
    a regenerated catalyst conduit in communication with said regenerator; said regenerated catalyst conduit intersecting said riser at a regenerated catalyst conduit intersection for transporting regenerated catalyst to said riser;
    a regenerated catalyst baffle in said riser below said feed distributor and proximate to said regenerated catalyst conduit intersection for mixing the regenerated catalyst.

2. The apparatus of claim 1 wherein said regenerated catalyst conduit defines a regenerated catalyst inlet to said riser and said regenerated catalyst baffle is disposed above said regenerated catalyst inlet.

3. The apparatus of claim 1 wherein said regenerated catalyst baffle is an extension of said regenerated catalyst conduit.

4. The apparatus of claim 1 wherein a horizontal component of said regenerated catalyst baffle extends into the riser by at least one-half of the diameter of the riser.

5. The apparatus of claim 1 further including a carbonized catalyst conduit in communication with said reactor vessel, said carbonized catalyst conduit intersecting said riser at a carbonized catalyst conduit intersection for transporting carbonized catalyst to said riser and further including a carbonized catalyst baffle proximate to the said carbonized catalyst conduit intersection.

6. The apparatus of claim 1 wherein said regenerated catalyst conduit intersection is above said carbonized catalyst conduit intersection.

7. The apparatus of claim 1 wherein said regenerated catalyst conduit and said carbonized catalyst conduit define a horizontal angle of at least about 135 degrees at a respective one of said regenerated catalyst conduit intersection and said carbonized catalyst conduit intersection.

8. The apparatus of claim 1 wherein said regenerated catalyst conduit and said riser define a vertical angle of about 25 to about 35 degrees at the carbonized catalyst conduit intersection.

9. An apparatus for mixing regenerated catalyst and carbonized catalyst for contact with a hydrocarbon feed, said apparatus comprising:
a riser in which said hydrocarbon feed is contacted with catalyst particles to catalytically crack hydrocarbons in said hydrocarbon feed to produce a gaseous product of lighter hydrocarbons and carbonized catalyst;
a feed distributor for distributing hydrocarbon feed to said riser;
a reactor vessel in communication with said riser, said reactor vessel for separating the carbonized catalyst and the gaseous product;
a regenerator vessel in communication with said reactor vessel, said regenerator vessel for combusting carbon from the carbonized catalyst with an oxygen-containing gas to provide regenerated catalyst;
a regenerated catalyst conduit in communication with said regenerator; said regenerated catalyst conduit intersecting said riser at a regenerated catalyst conduit intersection for transporting regenerated catalyst to said riser;
a carbonized catalyst conduit in communication with said reactor vessel, said carbonized catalyst conduit intersecting said riser at a carbonized catalyst conduit intersection for transporting carbonized catalyst to said riser;
a baffle in said riser below said feed distributor and proximate to one of said regenerated catalyst conduit intersection and said carbonized catalyst conduit intersection for mixing the carbonized catalyst and the regenerated catalyst.

10. The apparatus of claim 9 wherein said baffle is a regenerated catalyst baffle proximate to said regenerated catalyst conduit intersection and further including a carbonized catalyst baffle proximate to the said carbonized catalyst conduit intersection.

11. The apparatus of claim 9 wherein said regenerated catalyst conduit defines a regenerated catalyst inlet to said riser and said carbonized catalyst conduit defines an carbonized catalyst inlet to said riser said baffle is disposed above one of said regenerated catalyst inlet and said carbonized catalyst inlet.

12. The apparatus of claim 9 wherein said baffle is an extension of one of said regenerated catalyst conduit and said carbonized catalyst conduit into the riser.

13. The apparatus of claim 9 wherein said regenerated catalyst conduit intersection is above said carbonized catalyst conduit intersection.

14. The apparatus of claim 9 wherein said regenerated catalyst conduit and said carbonized catalyst conduit define a horizontal angle of at least about 135 degrees at respective ones of said regenerated catalyst conduit intersection and said carbonized catalyst conduit intersection.

15. The apparatus of claim 9 wherein said regenerated catalyst conduit and said riser define a vertical angle of about 25 to about 35 degrees at the carbonized catalyst conduit intersection.

16. The apparatus of claim 9 wherein a horizontal component of said baffle extends into the riser by at least one-half of the diameter of the riser.

17. An apparatus for mixing regenerated catalyst and carbonized catalyst for contact with a hydrocarbon feed, said apparatus comprising:
a riser in which said hydrocarbon feed is contacted with catalyst particles to catalytically crack hydrocarbons in said hydrocarbon feed to produce a gaseous product of lighter hydrocarbons and carbonized catalyst;
a feed distributor for distributing hydrocarbon feed to said riser;
a reactor vessel in communication with said riser, said reactor vessel for separating the carbonized catalyst and the gaseous product;
a regenerator vessel in communication with said reactor vessel, said regenerator vessel for combusting carbon from the carbonized catalyst with an oxygen-containing gas to provide regenerated catalyst;
a regenerated catalyst conduit in communication with said regenerator; said regenerated catalyst conduit intersecting said riser at a regenerated catalyst conduit intersection below said feed distributor, said regenerated catalyst conduit for transporting regenerated catalyst to said riser; and
a carbonized catalyst conduit in communication with said reactor vessel, said carbonized catalyst conduit intersecting said riser at a carbonized catalyst conduit intersection below said feed distributor, said carbonized catalyst conduit for transporting carbonized catalyst to said riser;
wherein said regenerated catalyst conduit and said carbonized catalyst conduit define a horizontal angle of at least about 135 degrees at respective ones of said regenerated catalyst conduit intersection and said carbonized catalyst conduit intersection.

18. The apparatus of claim 17 wherein said regenerated catalyst conduit intersection is above said carbonized catalyst conduit intersection.

19. The apparatus of claim 17 wherein said carbonized catalyst conduit and said riser define a vertical angle of about 25 to about 35 degrees at the carbonized catalyst conduit intersection.

* * * * *